US006229137B1

(12) United States Patent
Bohn

(10) Patent No.: US 6,229,137 B1
(45) Date of Patent: May 8, 2001

(54) SCAN LINE ILLUMINATION SYSTEM UTILIZING HOLLOW REFLECTOR

(75) Inventor: David D. Bohn, Ft. Collins, CO (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/152,966

(22) Filed: Sep. 14, 1998

(51) Int. Cl.[7] .................... F21V 7/04; H04N 1/46

(52) U.S. Cl. .................... 250/234; 250/216; 362/551; 362/296

(58) Field of Search .................... 250/234, 235, 250/236, 216, 228; 362/31, 558, 551, 291, 296, 304, 305, 307, 310, 311; 358/474, 475, 484, 509, 510

(56) References Cited

U.S. PATENT DOCUMENTS

| | | | |
|---|---|---|---|
| 4,453,180 * | 6/1984 | Juergensen | 358/510 |
| 4,460,939 * | 7/1984 | Murakami et al. | 362/31 |
| 4,926,041 | 5/1990 | Boyd | 250/226 |
| 4,959,541 | 9/1990 | Boyd | 250/237 |
| 5,038,028 | 8/1991 | Boyd et al. | 250/208.1 |
| 5,089,712 | 2/1992 | Holland | 250/557 |
| 5,306,908 | 4/1994 | McConica et al. | 250/234 |
| 5,381,020 | 1/1995 | Kochis et al. | 250/566 |
| 5,523,562 | 6/1996 | Maple | 250/235 |
| 5,552,597 | 9/1996 | McConica | 250/208.1 |
| 5,578,813 | 11/1996 | Allen et al. | 250/208.1 |
| 5,586,212 | 12/1996 | McConica et al. | 385/146 |
| 5,646,402 | 7/1997 | Khovaylo et al. | 250/234 |
| 6,033,086 * | 3/2000 | Bohn | 362/235 |

OTHER PUBLICATIONS

Serial No. 09/070,142 filed Apr. 30, 1998, for "Compact Illumination System for Image Scanner" of David D. Bohn. Now Patent No. 6,033,086, issued on Mar. 7, 2000.

* cited by examiner

*Primary Examiner*—John Lee

(57) ABSTRACT

An illumination system for illuminating a scan region on an object may comprise a hollow reflector having an interior reflective surface, an entrance aperture, and an exit aperture. A light source is positioned adjacent the entrance aperture of the hollow reflector so that some of the light rays produced by the light source pass through the entrance aperture and are reflected by the interior reflective surface of the hollow reflector before passing through the exit aperture.

17 Claims, 5 Drawing Sheets

SCAN LINE ILLUMINATION SYSTEM UTILIZING HOLLOW REFLECTOR

FIELD OF INVENTION

This invention relates to scanner devices in general and more specifically to illumination systems for hand-held scanner devices.

BACKGROUND

Optical scanner devices are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A hand-held or portable optical scanner is an optical scanner which is designed to be moved by hand across the object or document being scanned. The hand-held scanner may be connected directly to a separate computer by a data cable. If so, the data signals produced by the hand-held scanner may be transferred to the separate computer "on the fly," i.e., as the image data are collected. Alternatively, the hand-scanner may include an on-board data storage system for storing the image data. The image data may be downloaded to a separate computer after the scanning operation is complete by any convenient means, such as via a cable or an optical infrared data link.

Hand-held or portable optical scanners are well-known in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical hand-held optical scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the hand-held scanner with respect to the object. By way of example, the illumination system may include a light source (e.g., a fluorescent or incandescent lamp or an array of light emitting diodes (LEDs)). The optical system may include a lens and/or mirror assembly to focus the image of the illuminated scan line onto the surface of the detector. Alternatively, a "contact image sensor" (CIS) may be used to collect and focus light from the illuminated scan region onto the detector.

The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots of an image focused thereon.

The term "image light" as used herein refers to the light that is focused onto the surface of the detector array by the optical system. Depending on the type of scanner and the type of document, the image light may be reflected from the document or object being scanned or it may be transmitted through the object or document. The image light may be converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital signals then may be processed and/or stored as desired.

While portable image scanners of the type described above are being used, they are not without their problems. For example, the quality of the image data produced by a scanner is usually related to the quality of the illumination that is provided to the scan region. If the illumination is not sufficiently bright, the result may be excessive noise in the image data which may manifest itself as "snow." Other problems may appear if the level of illumination is not substantially uniform along the length of the scan line. In such cases, the resulting image data may be of variable quality along the length of the scan line. Extreme variations of illumination may even result in "drop outs" in the image data.

Still other problems may develop if the illumination system is to be used with a battery powered hand-held or portable image scanner. For example, in order to minimize the power drain on the battery most portable image scanners are designed to provide the minimum amount of illumination commensurate with good image quality. Unfortunately, however, such low power illumination systems provide little margin against illumination variations. Consequently, even slight variations in illumination may well result in portions of the scan line being insufficiently illuminated. Another problem with many illumination systems is that only a small fraction of the light produced by the light source is used to illuminate the scan region.

SUMMARY OF THE INVENTION

An illumination system for illuminating a scan region on an object may comprise a hollow reflector having an interior reflective surface, an entrance aperture, and an exit aperture. A light source for producing a plurality of light rays is positioned adjacent the entrance aperture of the hollow reflector so that some of the light rays produced by the light source pass through the entrance aperture and are reflected by the interior reflective surface of the hollow reflector before passing through the exit aperture. The light rays that pass through the exit aperture illuminate the scan region on the object.

Also disclosed is a method for illuminating the scan region that comprises the steps of: Providing a hollow reflector having an interior reflecting surface and an exit aperture; and directing a plurality of light rays onto the interior reflecting surface of the hollow reflector so that the interior reflecting surface reflects some of the light rays through the exit aperture in the hollow reflector.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
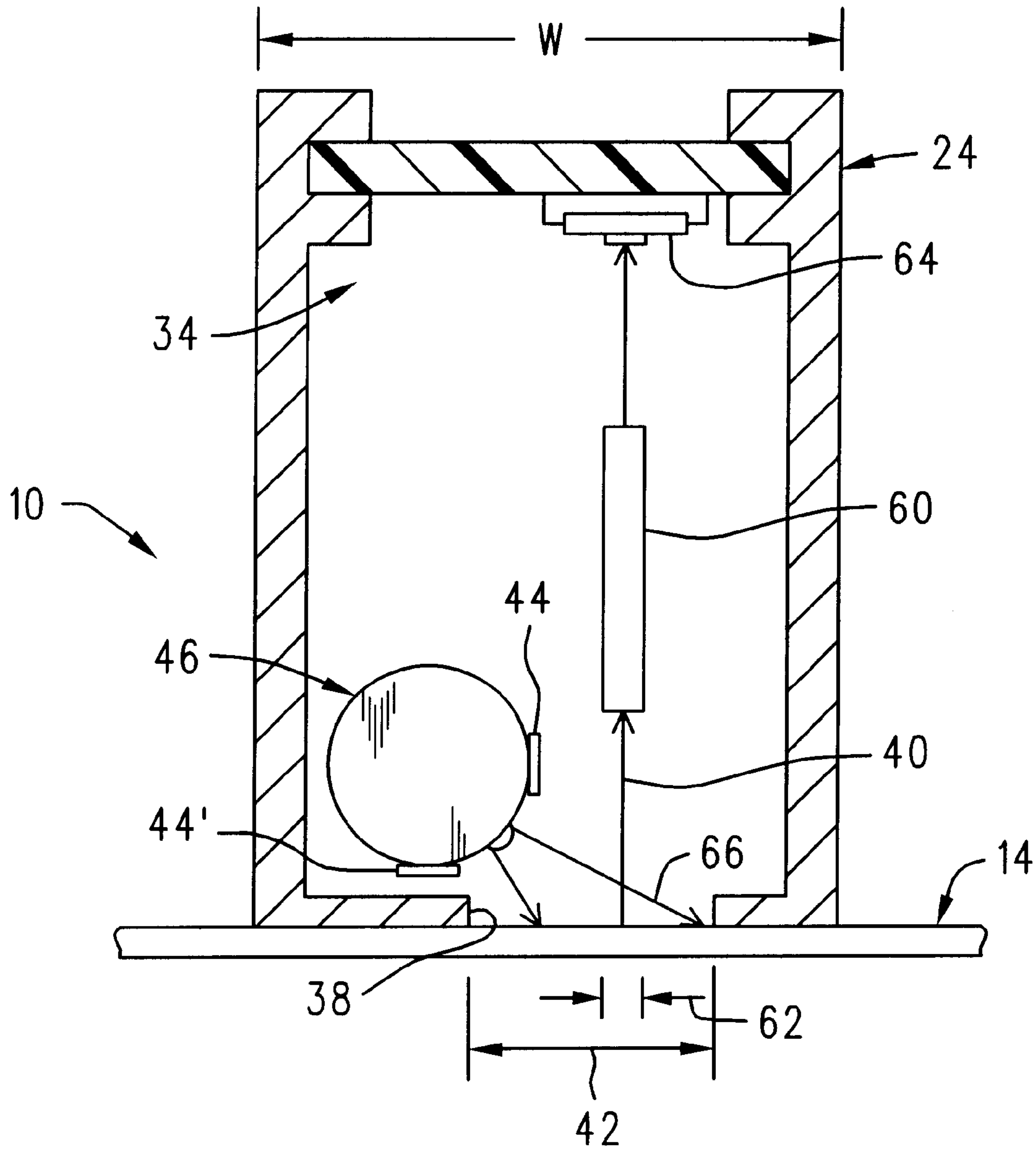
FIG. 1 is a cross-section view in elevation of an image head portion of a portable scanner device having a hollow reflector illumination system according to the present invention.

A hollow reflector illumination system 10 according to the present invention is shown in FIG. 1 as it could be used in a hand-held or portable image scanner 12 to scan an object 14, such as a document 16 with written text 18 provided thereon. See FIG. 2. For example, in the application illustrated in FIG. 2, the entire document 16 may be scanned by moving the portable image scanner 12 over the document 16 along a meandering or curvilinear scanning path 20. As will be explained in greater detail below, the hollow reflector illumination system 10 (FIG. 1) associated with the portable image scanner 12 provides improved illumination of a scan region 42 on the object 14.

Figure 2:
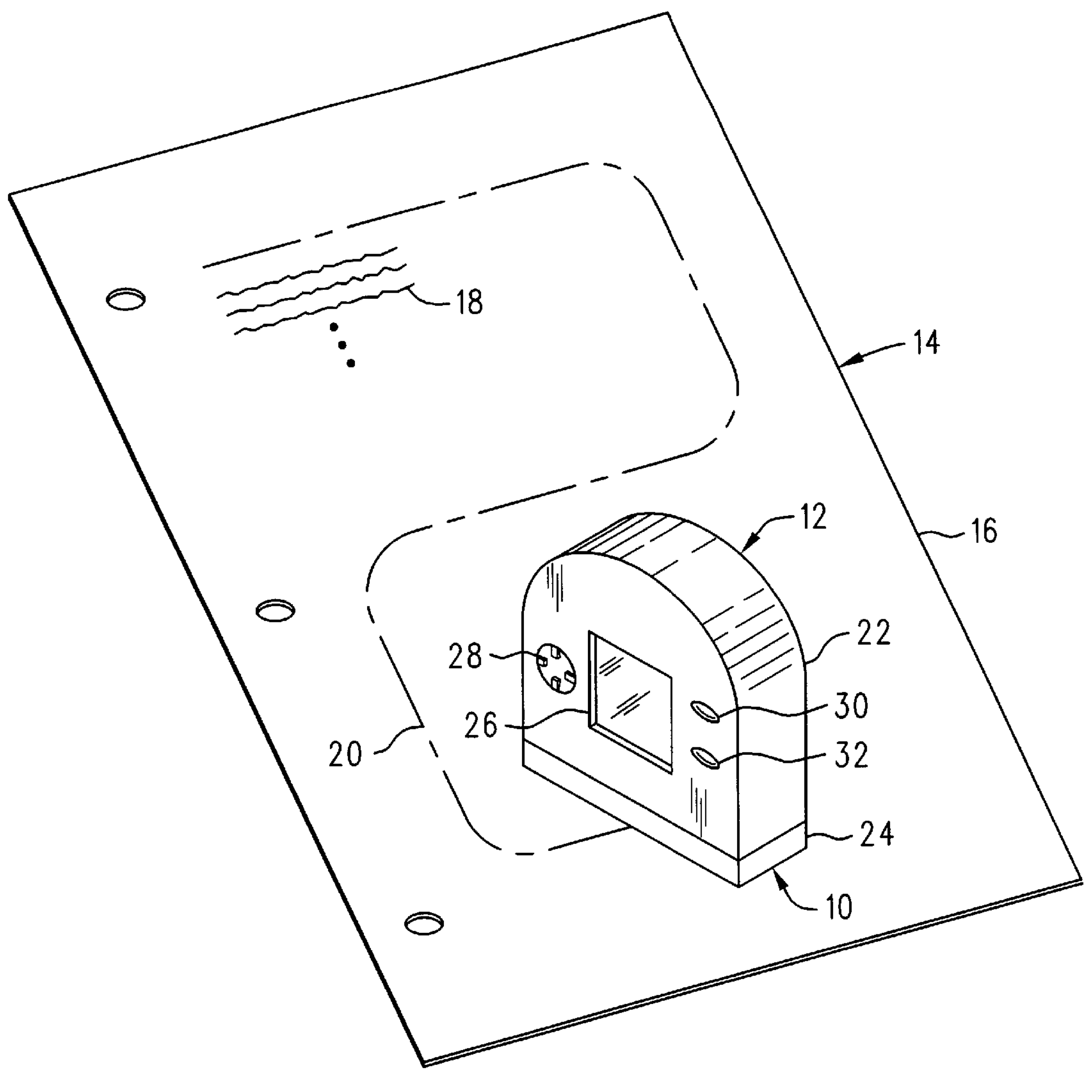
FIG. 2 is a perspective view of the portable scanner device as it could be used to scan an object.
Figure 3:
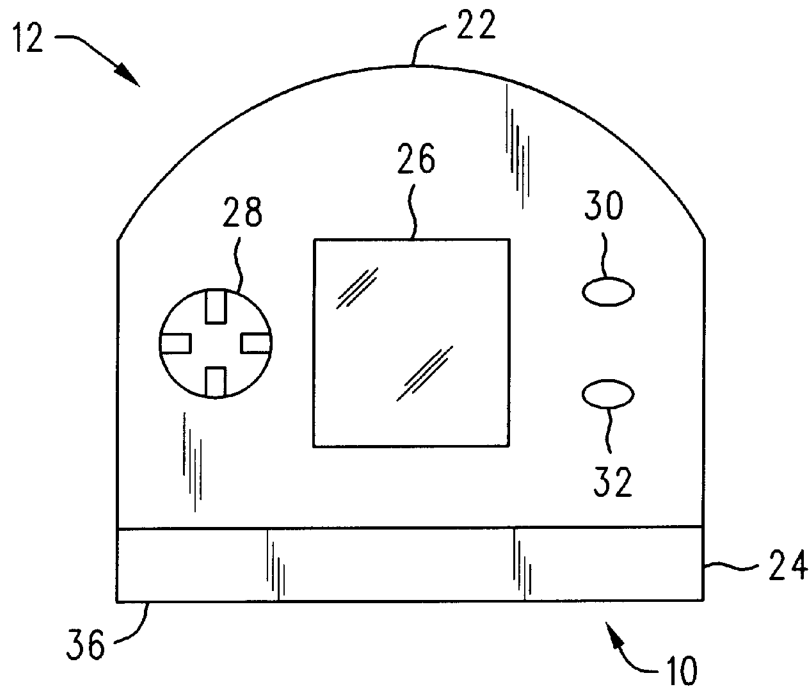
FIG. 3 is a front view in elevation of the portable scanner device shown in FIG. 2.

Referring now primarily to FIGS. 2 and 3, one embodiment of the portable image scanner 12 utilizing the hollow reflector illumination system 10 may comprise a main body portion 22 and an image head portion 24. The main body portion 22 of the portable image scanner 12 may be sized to receive the various electronic components and other devices (not shown) that may be necessary or desired for the operation of the portable image scanner 12. For example, in addition to housing the various electronic components (not shown) required for the operation of the portable image scanner 12, the main body portion 22 may also be provided with a display device 26, along with various buttons or switches 28, 30, and 32 to control the function and operation of the image scanner 12. The main body portion 22 may also be sized to receive a suitable power source, such as a battery (not shown), to provide electrical power to the portable image scanner 12.

The image head portion 24 of portable image scanner 12 is best seen in FIG. 1 may be configured to receive the hollow reflector illumination system 10 and also an image sensing system 34. The face or contact surface 36 (FIG. 4) of the image head portion 24 may be provided with an elongate window 38 therein which allows the hollow reflector illumination system 10 to direct a concentrated light beam 66 onto the scan region 42 on the object 14. The window 38 also allows image light 40 reflected by the illuminated scan region 42 to be received by the image sensing system 34. See FIG. 1. The image sensing system 34 produces an image signal (not shown) based on the image light 40. Image data contained in the image signal (not shown) may then be processed or manipulated by an image data processing system (not shown) to produce image data that is representative of the object 14.

Figure 5:
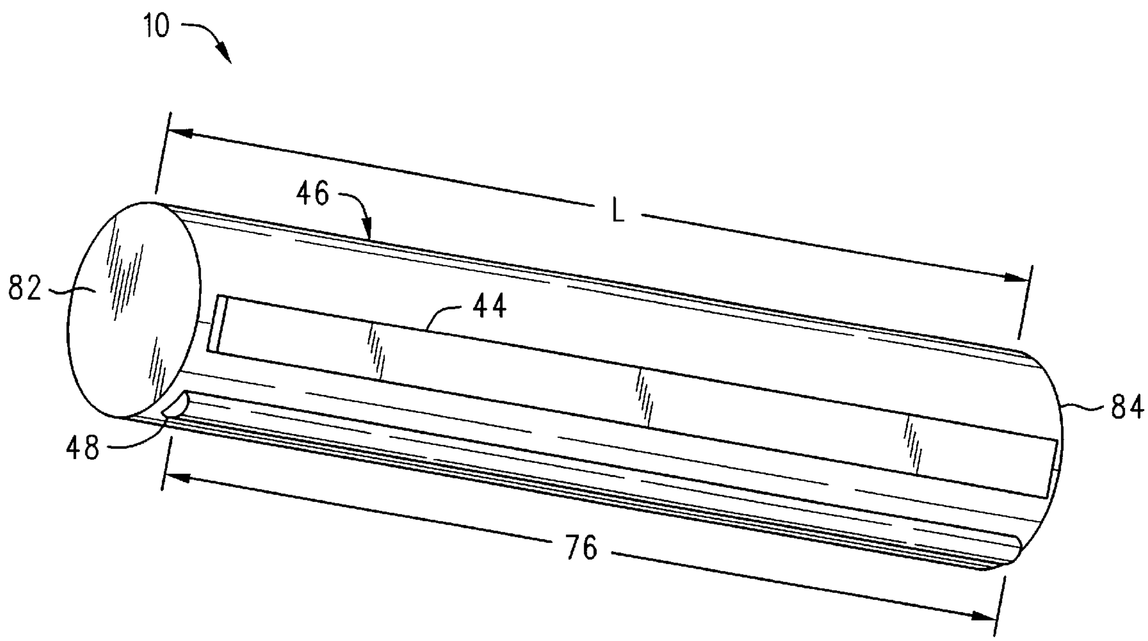
FIG. 5 is a perspective view of the hollow reflector showing the relative positions of the light source and lens.
Figure 6:
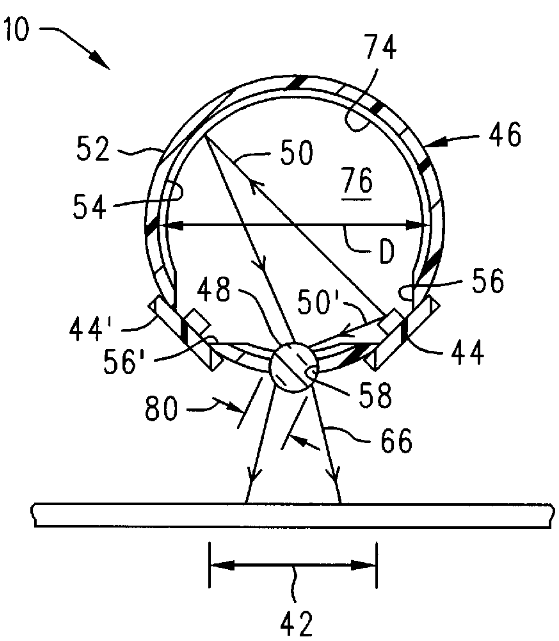
FIG. 6 is an enlarged cross-section view in elevation of the hollow reflector showing the positions of the light source and lens.

The hollow reflector illumination system 10 is best seen in FIGS. 1, 5, and 6 and may be used to illuminate the scan region 42 of the object 14. In one preferred embodiment, the hollow reflector illumination system 10 may comprise one or more light source assemblies 44, a hollow reflector 46, and a concentrating lens 48. In the embodiment shown and described herein, the hollow reflector illumination system 10 is provided with two light source assemblies 44. Alternatively, a greater or lesser number of light sources may also be used, as will be described in greater detail below. Regardless of the particular number of light sources 44 that are used, the hollow reflector 46 reflects toward the scan region 42 light rays (e.g., 50 and 50') produced by the light source assembly or assemblies 44.

Referring now specifically to FIGS. 5 and 6, the hollow reflector 46 may comprise an elongate, generally cylindrically shaped member having a sidewall portion 52 that defines a generally cylindrically shaped interior reflective surface 54. In one preferred embodiment, the interior reflective surface 54 comprises a diffuse reflective surface to provide increased diffusion of the light rays, as will be described in greater detail below. The sidewall portion 52 of hollow reflector 46 may also be provided with one or more entrance apertures 56 (i.e., one for each light source assembly 44) and at least one exit aperture 58. Each entrance aperture 56 may be sized to receive the light source assembly 44 in the manner best seen in FIG. 6. The exit aperture 58 may be sized to receive the concentrating lens 48 which, in one preferred embodiment, may comprise a cylindrical lens. Alternatively, other types of lenses may also be used, as will be described in greater detail below. In still another application, the lens 48 may be omitted entirely. In the embodiment shown and described herein, the lens 48 concentrates, or at least partially concentrates, the light rays 50, 50' to produce a concentrated light beam 66. The concentrated light beam 66 is then directed to the scan region 42 thereby illuminating the same.

The portable image scanner 12 may be operated as follows to scan an object 14, such as a document 16 with written text 18 thereon. As a first step, the user (not shown) would set-up or initialize the portable image scanner 12 to perform the scanning operation by actuating the appropriate buttons or switches (e.g., 28, 30, and 32) in accordance with the particular operational sequence for the specific scanner device 12. The user may then place the contact surface or face 36 of the scanner 12 against the document 16 and initiate the scanning operation. Each light source assembly 44 produces a plurality of light rays (e.g., 50, 50') over a substantial angle (nearly 180° for certain types of light sources), as best seen in FIG. 6. The diffuse reflection provided by the internal reflective surface 54 of the hollow reflector 46 reflects toward the lens 48 a substantial portion of the light rays 50 produced by the light source assemblies 44. The lens 48 substantially concentrates the light rays to produce a concentrated beam 66 which is then directed onto the scanning region 42.

More specifically, in the embodiment shown and described herein, most of the light rays 50 produced by each light source assembly 44 are reflected by the interior reflective surface 54 of the hollow reflector 46 before being incident on the lens 48. Other light rays 50' produced by each light source assembly 44 will be directly incident on the lens 48. Consequently, the lens 48 receives light rays which follow at least two different paths (e.g., via the internal reflecting surface 54 of the hollow reflector 46 (e.g., light rays 50) and direct from the light source assemblies 44 (e.g., light rays 50'). The hollow reflector 46 is thereby able to direct a larger portion of the light rays produced by the light source assemblies 44 onto the scan region 42.

A significant advantage of the hollow reflector illumination system 10 according to the present invention is that it provides for improved illumination uniformity of the scan region 42, thereby generally enhancing the overall quality of the image data produced by the image sensing system 34. The hollow reflector illumination system 10 also directs toward the scan region 42 a greater portion of the light rays (e.g., 50, 50') produced by the light source 44. Consequently, the hollow reflector illumination system 10 allows a lower power light source to be used while providing the same illumination as other types of illumination systems utilizing higher power light sources. Use of a lower power light source to provide the same level of illumination can be a significant advantage in portable scanner applications where an on-board battery system provides the power required to operate the light source.

Still other advantages are associated with the hollow reflector illumination system 10. For example, besides directing additional light rays 50' toward the scan region 42, the hollow reflector 46 also serves as a light baffle to reduce the amount of stray light produced by the light sources 44 that may inadvertently enter the optical system 60 of the image sensing system 34. The reduction in the amount of stray light entering the optical system 60 of the image sensing system 34 tends to improve the quality of the resulting scanned image data. The arrangement of the hollow reflector 46 also reduces the lateral space required by the illumination system 10. That is, the hollow reflector illumination system 10 may allow the width W (FIG. 1) of the image head 24 to be reduced when compared with other types of illumination systems.

Having briefly described the hollow reflector illumination system 10, its use in a portable image scanner 12, as well as some of its more significant features and advantages, the various embodiments of the hollow reflector illumination system 10 will now be described in detail. However, before proceeding with the detailed description it should be noted that while the hollow reflector illumination system 10 is shown and described herein as it could be used in a portable image scanner 12, it is not limited to use with any particular type or style of scanner device. For example, the hollow reflector illumination system 10 could also be used in a flatbed scanner or even in a photocopy machine. It should also be noted that while the portable image scanner 12 is shown and described herein as it may be used to scan an object 14, such as a document 16 with written text 18 thereon, it is not limited to use with any particular type of object 14. Indeed, the portable image scanner 12 may be used to scan almost any type of object imaginable. Accordingly, the hollow reflector illumination system 10 according to the present invention should not be regarded as limited to the particular type of portable scanner device and applications shown and described herein.

With the foregoing considerations in mind, one preferred embodiment of the hollow reflector illumination system 10 is shown in FIGS. 1–4 as it could be used in a portable or hand-held image scanner 12 which may be used to scan an object 14, such as a document 16 with written text 18 thereon. In order to scan the entire document 16, it may be necessary for the user to move the portable image scanner 12 along a curvilinear or meandering scanning path 20. If so, the portable scanner device 12 may be provided with a navigation system (not shown) to allow image data (not shown) obtained along the meandering or curvilinear scanning path 20 to be "stitched" together to provide image data representative of the entirety of the scanned object. Examples of navigation systems and stitching algorithms are disclosed in U.S. Pat. No. 5,089,712 of Holland for "Sheet Advancement Control System Detecting Fiber Pattern of Sheet" and U.S. Pat. No. 5,578,813 of Allen, et al., for "Freehand Image Scanning Device which Compensates for Non-Linear Movement," both of which are specifically incorporated herein by reference for all that they disclose. However, since the details of the navigation system and stitching algorithm that may be used in such a portable scanner device 12 are not necessary to understand or practice the present invention, the particular navigation system and stitching algorithm that may be utilized in one preferred embodiment of the portable image scanner 12 will not be described in further detail herein.

Figure 4:
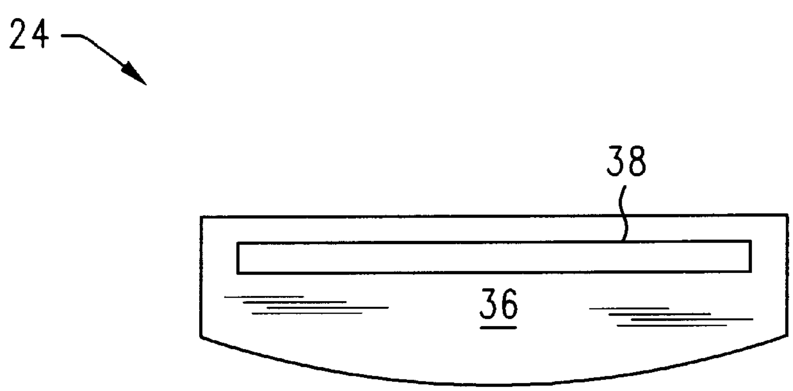
FIG. 4 is an elevation view of the contact surface of the image head portion of the portable scanner device.

Referring now primarily to FIGS. 2–4, the portable image scanner 12 may be provided with a main body portion 22 and an image head portion 24. The main body portion 22 may comprise an overall configuration or shape conducive to hand manipulation by a user (not shown), although other configurations may also be used. In one preferred embodiment, the main body portion 22 may be sized to receive the various electronic components (not shown) required for the operation of the portable image scanner 12. Alternatively, some or all of the various electronic components may be located elsewhere and may be connected to the main body portion 22 by a suitable data link, such as a cable (not shown). The main body portion 22 may also be provided with a display system 26 and various switching devices 28, 30, and 32 that may be required or desired for the operation of the portable image scanner 12. While the switching devices 28, 30, and 32 in one preferred embodiment are located on the front face of the main body portion 22 of scanner 12, they may be positioned at any convenient location on the portable image scanner 12. The electrical power required to operate the portable image scanner 12 may be provided by a suitable electrical power source, such as a battery (not shown), that may also be contained within the main body portion 22 of the portable image scanner 12. However, since the various electronic components, display devices, switching devices, and batteries that may be required or desired for use in a particular portable image scanner are well-known in the art and since descriptions of the various components are not required to understand or practice the present invention, the various components, e.g., electronic components (not shown), display device 26, switching devices 28, 30, and 32, etc., utilized in one preferred embodiment of the portable image scanner 12 will not be described in further detail herein.

The main body portion 22 of scanner 12 may be made from any of a wide range of materials, such as metals or plastics, suitable for the intended application. By way of example, in one preferred embodiment, the main body portion 22 is made from polycarbonate plastic, although other materials could also be used.

Referring now to FIGS. 1 and 4 simultaneously, the image head portion 24 of portable scanner 12 may comprise a separate assembly that is attached to the main body portion 22. Alternatively, the image head portion 24 may comprise an integral part of the main body portion 22. In any event, the image head portion 24 may be sized to receive the image sensing system 34 and the hollow reflector illumination system 10. Essentially, the image sensing system 34 is responsive to image light 40 reflected by an illuminated scan line 62 generally contained within the bounds of the illuminated scan region 42. The image sensing system 34 produces an image signal (not shown) representative of the scan line 62. The image sensing system 34 may comprise any of a wide variety of imaging systems now known or that may be developed in the future that are suitable for producing image data relating to image light 40 reflected by the object 14 being scanned. Consequently, the present invention should not be regarded as limited to any particular type of imaging system or image system configuration. However, by way of example, the imaging system 34 utilized in one preferred embodiment of the invention may include an optical system 60 for directing to a detector assembly 64 image light 40 reflected by the scan line 62 contained within the illuminated scan region 42. The detector assembly 64 produces an image signal (not shown) related to the image light 40.

The various components of the image sensing system 34 may comprise any of a wide range of components and devices that are well-known in the art and that would be suitable for the particular application. For example, in one preferred embodiment, the optical system 60 used to direct and focus the image light 40 onto the surface of detector assembly 64 may comprise a contact image sensor (CIS), such as a contact image sensor of the type sold under the name SELFOC which is a registered trademark of the Nippon Sheet Glass Company, Limited. Alternatively, other types of imaging systems, such as projection imaging systems involving lenses and/or reflectors, could also be used. The detector assembly 64 may comprise a CCD array having a resolution of 300 dpi (dots per inch), such as type TS105, available from Texas Instruments, Inc., of Austin, Tex. Alternatively, other types of detectors having the same or other resolutions could also be used.

The hollow reflector illumination system 10 may also be housed within the image head portion 24 of the portable image scanner 12. Referring now primarily to FIGS. 5 and 6, one preferred embodiment the hollow reflector illumination system 10 may include a hollow reflector assembly 46, a pair of light source assemblies 44, and the lens 48. Each of the foregoing components will now be described.

The hollow reflector assembly 46 may comprise an elongate, generally cylindrical member having a sidewall portion 52 that defines an interior reflecting surface 54. Sidewall portion 52 may also be provided with a pair of end cap portions 82, 84 for closing the ends of the cylindrical member. In one preferred embodiment, the interior reflecting surface 54 is essentially cylindrical in shape, having a circular cross-section and a length L that is essentially co-extensive with the length of the scan line 62. It is generally preferred, but not required, that the interior reflecting surface 54 comprise a diffusing reflective surface that, while reflecting a substantial amount of light incident thereon, also scatters the incident light. The scattering provided by the diffusing reflective surface 54 improves the uniformity of illumination along the length L of the hollow reflector 46 and also helps to smooth intensity variations that may occur along the length of the light source assembly or assemblies 44. Depending on the nature of the material comprising the sidewall portion 52 of hollow reflector 46, it may be necessary or desirable to provide a diffusing reflecting coating 74 on the interior reflecting surface 54 of the hollow reflector 46, as will be described in greater detail below.

The sidewall portion 52 of hollow reflector 46 may also be provided with at least one entrance aperture 56 and at least one exit aperture 58, as best seen in FIG. 6. The entrance aperture 56 provides a means for admitting into the interior 76 of hollow reflector 46 light (e.g., 50, 50') produced by the light source assembly 44. The number of entrance apertures 56 provided in the sidewall portion 52 should be commensurate with the number of separate light source assemblies 44 that are to be provided. For example, in the embodiment shown and described herein, the sidewall portion 52 of hollow reflector 46 is provided with two separate entrance apertures 56, 56' to accommodate the two separate light source assemblies 44, 44'. Alternatively, a single light source assembly 44 may be used, in which case the sidewall portion 52 of hollow reflector 46 need only be provided with a single entrance aperture 56. In still another alternative, three or more separate light source assemblies 44 could be used, in which case the sidewall portion 52 of hollow reflector 46 would be provided with a like number of entrance apertures 56. In accordance with the foregoing considerations, then, the present invention should not be regarded as limited to any particular number of entrance apertures 56 and light source assemblies 44.

Regardless of the specific number of light sources 44 and entrance apertures 56 that are to be provided in a particular embodiment, the entrance aperture or apertures 56 may be provided on the sidewall portion 52 at practically any radial location. The ability to provide the entrance aperture or apertures 56 at practically any radial location is due in large part to the diffuse reflecting characteristics of the internal reflecting surface 54. That is, by diffusing the light rays (e.g., 50) produced by the light source assembly or assemblies 44, 44', the internal reflecting surface 54 substantially masks or compensates for any illumination variations that may be associated with the light source assembly or assemblies 44, 44'. By way of example, in the embodiment shown and described herein, the sidewall portion 52 of hollow reflector 46 may be provided with two separate entrance apertures 56, 56' that are located at respective first and second radial positions on either side of the exit aperture 58, as best seen in FIG. 6.

The exit aperture 58 provides a means for allowing light to exit the interior 76 of hollow reflector 46. As was the case for the entrance aperture or apertures 56, 56' the exit aperture 58 may be located at practically any desired radial position. The ability to locate the exit aperture 58 at nearly any radial position is again due to the diffuse reflecting characteristics of the internal reflecting surface 54. By way of example, in one preferred embodiment, the exit aperture 58 is located substantially midway between the two entrance apertures 56, 56'. The entire hollow reflector assembly 46 may then be positioned as necessary within the image head portion 24 so that the concentrated light beam 66 is directed toward the scan region 42. See FIG. 1.

The sidewall portion 52 and end cap portions 82, 84 of hollow reflector assembly 46 may be made from any of a wide range of materials, such as metals or plastics, suitable for the intended application. By way of example, in one preferred embodiment, the sidewall portion 52 is molded as a unitary piece from polycarbonate plastic (e.g., Lexan®). The end cap portions 82, 84 may be made from the same material and then affixed to the ends of the sidewall portion 52 by any convenient fastening system or device, such as, for example, by an adhesive. It is preferred that the plastic used be colored white which provides a high degree of reflectivity for the internal reflective surface 54 defined by the sidewall portion 52. In addition to providing high reflectivity, the white coloring provides the diffuse reflection characteristics described above.

In another embodiment, the internal reflecting surface 54 of the sidewall portion 52 of hollow reflector 46 may be provided with a coating 74 to provide the diffuse reflecting characteristics. For example, the coating 74 may comprise a white paint, in which case the sidewall portion 52 of hollow reflector assembly 46 may be made from other materials, such as aluminum, that would not naturally provide such a diffuse reflecting surface. Still other coatings are known and may be used which would provide the diffuse reflecting characteristics described herein, as would be obvious to persons having ordinary skill in the art after having become familiar with the present invention. Consequently, the present invention should not be regarded as limited to the particular materials and coatings described herein to provide the internal reflecting surface 54 with the diffuse reflecting characteristics.

The diameter D and length L of the hollow reflector assembly 46 may comprise any of a wide range of values depending on the particular device and application in which the reflector 46 is to be used. By way of example, in one preferred embodiment, the sidewall portion 52 may have a length L in the range of about 50 mm to about 220 mm (125 mm preferred). The diameter D of the internal reflecting surface 54 may be in the range of about 5 mm to about 25 mm (10 mm preferred).

Figure 7:
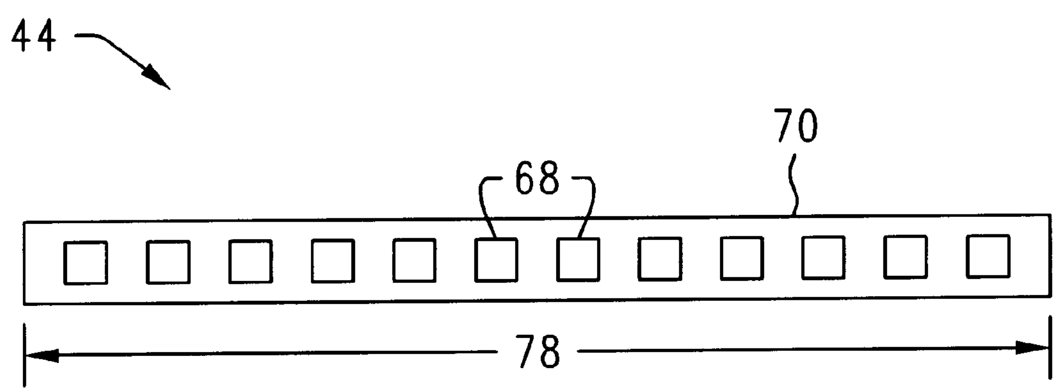
FIG. 7 is a plan view of a light emitting diode array that may be used to provide the illumination light.

The light source assemblies 44, 44' are essentially identical and may comprise any of a wide range of light sources for producing a plurality of light rays (e.g., 50) suitable for illuminating the scan region 42. By way of example, in one preferred embodiment, each light source 44, 44' may comprise a plurality of light emitting diodes 68 which may be positioned in spaced-apart relation on a suitable board or substrate 70, as best seen in FIG. 7. The board 70 may have a length 78 that is about equal to the length L of the hollow reflector 46. In one preferred embodiment, the board 70 may have a length 78 in the range of about 50 mm to about 220 mm (120 mm preferred), although other lengths could also be used. Each light source assembly 44, 44' is sized to be received by the corresponding entrance aperture 56, 56' provided in the sidewall portion 52 of hollow reflector 46. Each light source assembly 44, 44' may be affixed to the sidewall portion 52 with any of a wide range of fastening systems and devices well known in the art. By way of example, in one preferred embodiment, each light source assembly 44, 44' is affixed to the sidewall portion 52 by an adhesive.

Each light emitting diode 68 may comprise an LED part number HSMA-S690, available from Hewlett-Packard Company of Palo Alto, Calif. The light emitting diodes 68 utilized in one preferred embodiment produce a substantially uniform light output over a wide angle, nearly 180° in some cases. The number of LEDs 68 provided on the board 70 will depend on the length of the board 70 as well as on the desired intensity of the illumination that is to be provided to the scan region 42. By way of example, in one preferred embodiment, the board 70 may be provided with eighteen (18) separate light emitting diodes 68.

As was briefly mentioned above it is preferred, but not required, that the exit aperture 58 be provided with a lens 48 to concentrate, or at least partially concentrate, the light rays 50, 50' to form the concentrated illumination beam 66. The concentrated illumination beam 66 may then be used to illuminate the scan region 42, as best seen in FIGS. 1 and 6. The lens 48 may comprise any of a wide range of converging type lenses, such as a cylindrical lens, a plano-convex lens, or other type of aspheric lens, suitable for concentrating, or at least partially concentrating, the light rays 50, 50' from the light source assembly or assemblies 44, 44'. Consequently, the present invention should not be regarded as limited to any particular type of lens 48. By way of example, in one preferred embodiment, the lens 48 comprises a cylindrical lens.

The lens 48 may be made from any of a wide range of materials, such as glass or transparent plastic, suitable for the intended application. By way of example, in one preferred embodiment, the lens 48 is made from polycarbonate plastic, although other types of plastics, such as acrylic, polystyrene, or cyclic olefin co-polymer plastics, could also be used.

The length 76 (FIG. 5) and diameter 80 (FIG. 6) of lens 48 will be dependent on the specific design of the particular hollow reflector illumination system 10. For example, the length 76 of the lens 48 will be about equal to the overall length L of the hollow reflector assembly 46. In one preferred embodiment, the lens 48 has a length 76 in the range of about 50 mm to about 220 mm (120 mm preferred). The diameter 80 of the lens 48 will depend on the "power" or amount of convergence that is to be provided by the lens 48. By way of example, in one preferred embodiment, the lens 48 is provided with a diameter 80 in the range of about 2 mm to about 10 mm (3 mm preferred).

The lens 48 may be held within the exit aperture 58 by any of a wide range of fastening systems or devices well-known in the art and which are readily commercially available. By way of example, the lens 48 may be secured within the exit aperture 58 by any of a wide range of optical adhesives suitable for the particular materials from which are manufactured the sidewall portion 52 of hollow reflector 46 and lens 48.

The portable image scanner 12 may be operated as follows to scan an object 14, such as a document 16 with written text 18 thereon. As a first step, the operator would set-up or initialize the portable image scanner 12 to perform the scanning operation by actuating the appropriate buttons or switches (e.g., 28, 30, and 32) in accordance with the particular operational sequence for the specific scanner device 12. The operator may then place the contact surface or face 36 of the scanner 12 against the document 16 and initiate the scanning operation. During operation, each light source assembly 44 produces a plurality of light rays (e.g., 50, 50') over a substantial angle, as was described above. A substantial portion of the light rays 50 produced by the light sources 44, 44' are reflected and diffused by the internal reflecting surface 54 of the hollow reflector 46 before being incident on the lens 48. Other light rays 50' produced by the light sources 44, 44' are directly incident on the lens 48 and are not reflected by the internal reflecting surface 54. The lens 48 substantially concentrates the light rays 50 and 50' to produce the concentrated light beam 66. The concentrated light beam 66 illuminates the scan region 42, which may then be detected or "scanned" by the image sensing system 34 provided in the image head portion 24 of scanner 12.

It is contemplated that the inventive concepts herein described may be variously otherwise embodied and it is intended that the appended claims be construed to include alternative embodiments of the invention except insofar as limited by the prior art.

What is claimed is:

1. An illumination system for illuminating a scan region on an object, comprising:

a hollow reflector having an interior reflective surface, an entrance aperture, and an exit aperture;

a light source for producing a plurality of light rays, said light source being positioned adjacent the entrance aperture of said hollow reflector so that some of the light rays produced by said light source pass through the entrance aperture and are reflected by the interior reflective surface of said hollow reflector before passing through the exit aperture, the light rays passing through the exit aperture illuminating the scan region on the object.

2. The illumination system of claim 1, further comprising a lens positioned adjacent the exit aperture of said hollow reflector for concentrating light rays passing through the exit aperture of said hollow reflector.

3. The illumination system of claim 2, wherein said hollow reflector comprises a generally cylindrically shaped member having a sidewall that defines the interior reflective surface and wherein the entrance aperture comprises a generally elongate axial opening in the sidewall located at a first radial position on the sidewall and wherein the exit aperture comprises a generally elongate axial opening in the sidewall located at a second radial position on the sidewall.

4. The illumination system of claim 3, wherein the interior reflective surface of the sidewall is coated with a diffusing reflecting material.

5. The illumination system of claim 4, wherein said lens comprises a cylindrical lens.

6. The illumination system of claim 5, wherein said light source comprises a plurality of light emitting diodes.

7. An illumination system for illuminating a scan region on an object, comprising:

a hollow reflector having an interior reflective surface, an entrance aperture, and an exit aperture;

a light source for producing a plurality of light rays, said light source being positioned within the entrance aperture of said hollow reflector so that substantially all of the light rays produced by said light source enter said hollow reflector and are reflected by the interior reflective surface of said hollow reflector before passing through the exit aperture, the light rays passing through the exit aperture illuminating the scan region on the object.

8. The illumination system of claim 7, further comprising a lens positioned adjacent the exit aperture of said hollow reflector for concentrating light rays passing through the exit aperture of said hollow reflector.

9. The illumination system of claim 8, wherein said hollow reflector comprises a generally cylindrically shaped member having a sidewall that defines the interior reflective surface and wherein the entrance aperture comprises a generally elongate axial opening in the sidewall located at a first radial position on the sidewall and wherein the exit aperture comprises a generally elongate axial opening in the sidewall located at a second radial position on the sidewall.

10. The illumination system of claim 9, wherein the interior reflective surface of the sidewall is coated with a diffusing reflecting material.

11. The illumination system of claim 10, wherein said lens comprises a cylindrical lens.

12. The illumination system of claim 11, wherein said light source comprises a plurality of light emitting diodes.

13. An illumination system for illuminating a scan region on an object, comprising:

an elongate, generally cylindrically shaped member having a side wall that defines an interior reflective surface, said sidewall having an entrance aperture therein comprising a first generally elongate axial opening located at a first radial position on the sidewall and an exit aperture therein comprising a second generally elongate axial opening located at a second radial position;

a light source for producing a plurality of light rays, said light source being positioned adjacent the first generally elongate opening so that some of the plurality of light rays produced by said light source pass through the entrance aperture; and a lens positioned adjacent the second generally elongate opening, said lens concentrating light rays passing through the exit aperture.

14. An illumination system for illuminating a scan region on an object, comprising:

an elongate, generally cylindrically shaped member having a side wall that defines an interior reflective surface, said sidewall having an entrance aperture therein comprising a first generally elongate axial opening located at a first radial position on the sidewall and an exit aperture therein comprising a second generally elongate axial opening located at a second radial position;

a light source for producing a plurality of light rays, said light source being positioned within the first generally elongate opening so that substantially all of the plurality of light rays produced by said light source enter said elongate, generally cylindrically shaped member; and a lens positioned adjacent the second generally elongate opening, said lens concentrating light rays passing through the exit aperture.

15. An illumination system for illuminating a scan region on an object, comprising:

hollow reflector means having an interior reflective surface, an entrance aperture, and an exit aperture;

light source means for producing a plurality of light rays, said light source means being positioned adjacent the entrance aperture of said hollow reflector means so that some of the light rays produced by said light source means pass through the entrance aperture and are reflected by the interior reflective surface of said hollow reflector means before passing through the exit aperture, the light rays passing through the exit aperture illuminating the scan region on the object.

16. A method for illuminating a scan region on an object, comprising:

providing a hollow reflector having an interior reflecting surface and an exit aperture; and directing a plurality of light rays onto the interior reflecting surface of the hollow reflector, the interior reflecting surface reflecting some of the light rays through the exit aperture in the hollow reflector.

17. Scanner apparatus, comprising:

a main body;

an image sensing system mounted within said main body for sensing image light reflected by an illuminated scan region;

a hollow reflector mounted within said main body, said hollow reflector having an interior reflective surface, an entrance aperture, and an exit aperture;

a light source for producing a plurality of light rays, said light source being positioned within the entrance aperture of said hollow reflector so that substantially all of the light rays produced by said light source enter said hollow reflector and are reflected by the interior reflective surface of said hollow reflector before passing through the exit aperture, the light rays passing through the exit aperture illuminating the scan region.

* * * * *